United States Patent
Rees

[15] 3,660,815
[45] May 2, 1972

[54] ABRASION WEAR WARNING DEVICE FOR VEHICLE BRAKES

[72] Inventor: Donald W. Rees, 12912 Leisure, Warren, Mich. 48095

[22] Filed: Dec. 15, 1969

[21] Appl. No.: 885,170

[52] U.S. Cl. ..........................................340/52 A, 200/61.41
[51] Int. Cl. .......................................................G08b 21/00
[58] Field of Search..............340/52, 52 A, 52 B, 244, 269; 200/61.4, 61.41, 61.42, 61.44

[56] References Cited

UNITED STATES PATENTS

| | | | |
|---|---|---|---|
| 3,456,236 | 7/1969 | Labartino et al. | 340/52 |
| 3,312,936 | 4/1967 | Huntzinger | 340/59 |
| 3,461,447 | 8/1969 | Marouby | 340/244 |

*Primary Examiner*—Alvin H. Waring
*Attorney*—Arthur L. Girard

[57] ABSTRACT

The present invention provides an abrasion wear warning device for indicating when a predetermined wear point has been reached in a monitored part undergoing wear by abrasion, comprising a sensor means which is generally closed and part of an indicator circuit, but which upon wear of the monitored part to the predetermined wear point is opened thereby causing an indicator to be activated and to produce some visual, audible or other sensible reaction display to warn that the predetermined wear point in the monitored part has been reached.

7 Claims, 6 Drawing Figures

PATENTED MAY 2 1972  3,660,815
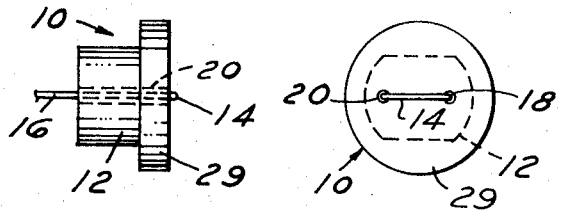
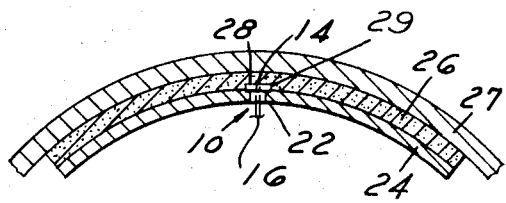
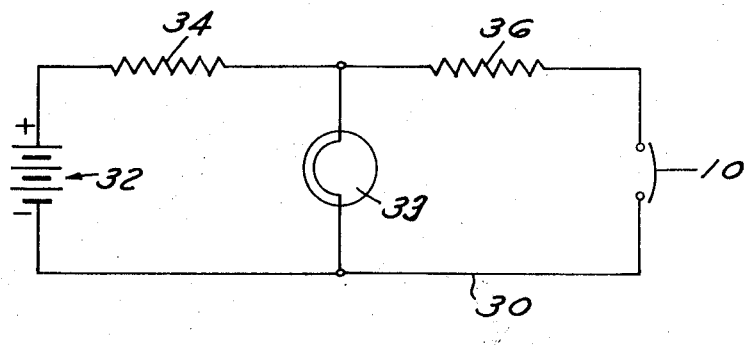
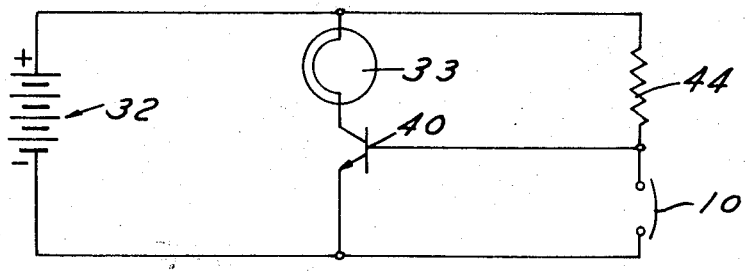
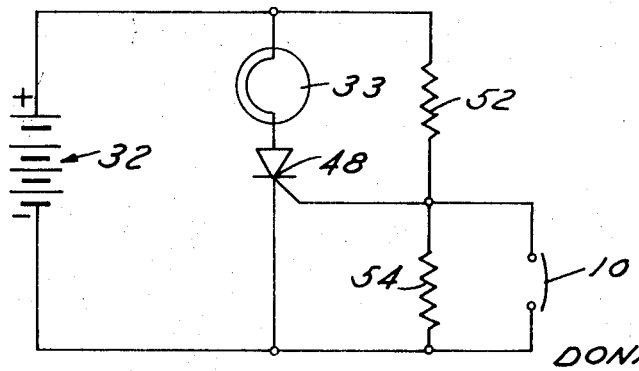
INVENTOR.
DONALD W. REES
BY
Arthur L. Girard
ATTORNEY

ABRASION WEAR WARNING DEVICE FOR VEHICLE BRAKES

The present invention relates to a novel abrasion wear warning device and more particularly to such a device for indicating when vehicle or other mechanical brake lining wear has reached a predetermined stage.

In the prior art, one of the most trying problems in determining when a critical wear state in an abrasion wearing part had been reached was the discovery of a method for making this determination without the necessity for complete disassembly of the wearing apparatus for purposes of visual or physical measurement inspection of the wearing part. Probably the best known example of such a problem and that which costs nearly every corporate, governmental and individual entity the most time and money annually is the problem of determining when vehicle brake linings of either the "shoe" or "pad" type have reached their critical wear state without complete, costly and complicated total disassembly and, generally, reassembly without replacement, of the entire wheel and brake apparatus before the clearly audible "squeeking" or "screeching" warning which indicates overwear and most generally extensive and expensive brake drum or disc damage occurs.

Numerous devices have been devised to solve this problem. The majority of these prior art devices are of two types. The first type calls for the installation of one contact in the brake lining at the point where wear indicates that the brake lining should be changed while the brake drum or disc is made the other contact in a powered circuit which includes an indicator of one king or another. Thus, when the desired degree of wear is reached, contact is made between the drum and the embedded contact closing the circuit and activating the indicator.

A second type of prior art device is one which measures the "take-up" or distance which the shoe and lining must travel to engage the brake drum in a conventional "shoe-in-drum" type brake.

Both of these systems are useful, however, both have definite shortcomings. In the case of the former "contact" systems wet brake linings, particularly when combined with winter operations wherein large quantities of salt water permeate the lining material often cause false indications of excessive wear which require unnecessary disassembly very similar to that required for visual inspection. Thus, although the device is useful under ideal conditions of operation, its use is limited and provides only unreliable indication of brake wear.

The use of the second type of device described above is limited to "shoe-in-drum" type brakes and hence is inapplicable to disc brakes or any other wearing part which does not operate in the same fashion as such brakes.

Furthermore, with the recent increased emphasis on safety and the call for automotive equipment which provides increased security for automobile users, the time is imminent when a simple and reliable system for indicating when brake lining or pad wear has reached a critical and therefor hazardous stage will be required in automobile manufacture to supplement the hydraulic pressure warning devices presently in wide usage. Thus, in addition to the convenience and economic factors involved in the use of a wear warning device, a safety factor is also present which may in the last instance prove to be the best reason for the development of such a device.

Thus, prior to the present invention, the brake lining of whatever shape or form had to be visibly inspected to determine if wear limits had been exceeded even when a wearing warning device of doubtful reliability was used. Inspection generally involved disassembly and removal of the vehicle wheel and the brake drum or disc caliper pad and, since lining wear varies with driver habits, driving conditions, type of lining material and brake and vehicle design, visual inspection of linings had to be performed often to insure against damage to the disc or drum due to excessive wear even when the aforementioned unreliable devices were employed. This problem therefore, remains one of the most frequently encountered and costly problems of vehicle maintenance.

It is therefore an object of the present invention to provide an improved simplified and totally reliable method for determining when critical or other predetermined amounts of brake lining or for that matter any other abrasive wear has reached a predetermined stage, and to provide remote indication of such wear to the vehicle or other equipment operator without the necessity for even partial disassembly of the brake or other wearing part.

Other objects and advantages of the present invention will be made obvious to those skilled in the art when the following description is considered in relation to the accompanying drawings of which:

FIG. 1 is a side view of the sensor portion of the device of the present invention;

FIG. 2 is a top plan view of the sensor portion of the device of the present invention;

FIG. 3 is a cross-sectional view of a typical installation of the sensor portion of the device of the present invention in a brake lining of the shoe type;

FIG. 4 shows a schematic diagram of one embodiment of the electrical circuit of the warning device of the instant invention;

FIG. 5 shows an alternative embodiment of the electrical circuit suitable for use in the warning device of the instant invention; and FIG. 6 shows a further alternative embodiment of the electrical circuit of the warning device of the present invention.

According to the present invention, there is provided an abrasion wear warning device comprising a sensor means and an indicator means connected by circuit means and adapted for connection to a power source, said sensor means normally being closed and therefore part of the circuit means, however, said sensor means becoming open and therefore removed from said circuit means when a predetermined degree of wear is experienced by an article whose abraison wear is being monitored with the device and the indicator means providing a readily detectable audible, visual or other sensible display when the sensor means is so removed from the circuit means.

More specifically, the invention provides a sensor element in circuit relation with an indicator means which sensor means at some point at or near the critical wear stage or any other predetermined wear point in a abrasion wearing element being monitored begins to undergo a simultaneous abrasion wearing which, at the point where the monitored element reaches its critical or other predetermined wear stage, undergoes a change which removes the sensor element from the circuit means of the warning device thereby causing the indicator means in the circuit to be activated and to produce a warning signal of one type or another.

As shown in greater detail in the drawings, the sensor element 10 consists basically of a small spool or other useful configuration of an insulative material 12 through which a loop 14 of a length of a suitable copper, aluminum or other conductive wire 16 which loop has been formed by passing wire 16 through apertures 18 and 20 in insulator 12. The loop 14, as described hereinafter, is adapted to be electrically connected into an indicator circuit.

For purposes of simplicity and clarity, the description of the wear warning device which follows will be made in relation to a brake lining application, however, it should be understood that the device is similarly applicable to an almost unending list of other applications wherein the detection of excessive or limited abrasion wear is desirable or necessary.

Installation of the sensor element into a typical brake apparatus is shown in FIG. 2. An aperture 22 is provided in brake shoe 24 for insertion of the sensor 10 into brake lining 26. The sensor 10, in the embodiment shown, is mounted in a recess 28 in lining 26 and a flange 29 on sensor 10 is provided to prevent the same from passing through aperture 22, which, in addition to providing passage for extension 12 of sensor 10, simultaneously provides access for wire 16 to loop 14 within the body of lining 26.

In operation, as the brake drum 27 wears the lining 26 away, it eventually reaches the top of loop 14 and begins to wear it away also. Eventually, the wire loop 14 (or any other suitably shaped segment of wire 16) is worn through causing the sensor element 10 to open and, as explained more fully hereinafter, activating an indicator element 33 which is connected to the sensor by circuit 30 shown in FIGS. 4-6.

FIG. 4 shows one embodiment of a circuit suitable for use in the device of the instant invention. As shown therein, the completed circuit consists of sensor element 10, described in detail above, an indicator 33, in this case, a lamp although any other audible, or visual display unit might be used, and a power source 32 all connected by circuit 30. Circuit 30, in addition to the elements already mentioned, also includes a first resistor means 34 and a second resistor means 36. Thus, the circuit consists basically of an indicator 33, and a sensor 10 in parallel across a suitable power supply 32. When the sensor is closed, i.e., loop 14 is whole, the current supply flows through both the indicator and the sensor. By proper adjustment of resistors 34 and 36, for example resistor 34 has a value of 15 ohms and resistor 36 a value of 3 ohms, most of the current can be made to flow through sensor 10 while the current through indicator lamp 33 is limited to a value insufficient to cause the lamp to light. When sensor 10 is opened, because of wear of loop 14 as described above, and is therefore removed from circuit 30, all of the current flows through indicator 33 causing it to light.

In vehicle applications, power source 32 will generally comprise a 6 or 12 volt DC battery, although, of course, the device is adaptable for use with almost any direct or alternating current power source with only minor adjustment in the circuitry and elements thereof being required.

Alternative embodiments of circuits suitable for use in the warning device of the instant invention, both of which make use of switching means to cause activation of the indicator means when the sensor means is opened, are shown in FIGS. 5 and 6.

In the embodiment of FIG. 5, the circuit consists of indicator lamp 33 similar to that used in the circuit of FIG. 4, and a semiconductor 40 in series circuit relation across a power supply 32 of the type used in FIG. 4. A resistor 44 and a wear sensor 10 similar to that used in the circuit of FIG. 4, are utilized to provide a bias voltage on semiconductor 40 which acts as a switch. The bias voltage prevents semiconductor 40 from passing current when sensor 10 is closed, however, when sensor 10 is opened because of abrasive wear loop 14 as described above, the bias voltage on the semiconductor 40 changes allowing it to pass current through the lamp or other indicator means 33, thus giving an observable and detectable display of sensor opening and hence achievement of critical or other predetermined wear stage in the monitored brake lining or other part.

FIG. 6 illustrates yet another circuit which can be used to provide the wear warning described above. In the circuit of FIG. 6, a silicon controlled rectifier 48 is utilized in series with indicator element 33 in this case again a lamp similar to that used in FIGS. 4 and 5. Additionally, a first resistance means 52 and a second resistance means 54 in parallel with rectifier 48 and indicator 33 are used. When properly adjusted, resistors 52 and 54 bias silicon controlled rectifier 48 preventing current flow through indicator 33 when sensor 10 is closed. When sensor 10 is opened by virtue of loop 14 thereof being worn through by the abrading surface, the bias potential of the silicon controlled rectifier gate is increased causing silicon controlled rectifier 48 to conduct and indicator element 33 to produce its display. The circuit also includes a suitable power supply 32 as a source of current.

Thus, in the alternative circuits of FIGS. 5 and 6 a switching means is introduced into the sensing circuit which permits activation of the indicator means upon opening of the sensor.

An alternative application of the basic principle and device of the present invention comprises the installation of a plurality of the sensors at various levels in the wearing monitored part so that a determination of percent of wear could be made as the part undergoes abrasive wear. For example, three sensor elements could be implanted in the wearing part in such a fashion that one of them is triggered at 25, 50 and 100 percent of useful wear and a sensible display, which could be shut off, produced at each of these levels.

As already mentioned, although the wear warning device has been described primarily in conjunction with a brake lining application, it has numerous other areas of usage including but not limited to warning of excessive wear in shafts, bearings, sliding surfaces, tires and generally in all other mechanical parts where undetected excessive abrading wear poses a problem.

The invention had been described in detail with particular reference to preferred embodiments thereof, but it should be understood that variations and modifications thereof can be effected within the spirit and scope of the invention.

I claim:

1. An apparatus for indicating when a predetermined wear point has been achieved in a monitored part having wearing and non-wearing portions and undergoing wear by abrasion comprising:
    a replaceable sensor element of an insulative material designed for insertion into a recess in the non-wearing area of said monitored part extending into said wearing area and having a severable wire therethrough to form a loop thereon on the portion of said sensor element closest to the surface of said wearing portion;
    indicator means connected to said sensor element by a single electrical circuit having no moveable mechanical parts and adapted to be connected to a power source;
    said severable wire normally being whole and therefore part of said circuit under conditions of normal operation, however, said wire becoming open and therefore removed from said circuit when said predetermined wear point has been achieved by said monitored part;
    severance of said wire causing activation of said indicator means to provide a sensible display that said predetermined wear point has been achieved.

2. The device of claim 1 wherein said circuit means includes a first resistor means in series circuit relation with said indicator means and said sensor means, and a second resistor means in series circuit relation with said sensor means and in parallel circuit relation with said indicator means, said first and said second resistor means being adjusted such that substantially all of any current which is applied to said circuit means passes through said sensor means when said sensor means is closed, and all of said current which may be applied to said circuit means passes through said indicator means when said sensor means is open.

3. The device of claim 1 including a switching means which activates said indicator means when said sensor means achieves an open condition due to said monitored part achieving said predetermined wear condition.

4. The device of claim 3 wherein said switching means is a semiconductor.

5. The device of claim 4 wherein said sensor means and a resistance means are connected in parallel circuit relation with said semiconductor by said circuit means and said indicator means to provide a bias voltage which prevents said semiconductor from passing current to said indicator means when said sensor means is closed, and permits said current to flow to said indicator means when said bias is altered by opening of said sensor means.

6. The device of claim 3 wherein said switching means comprises a silicon controlled rectifier in series circuit relation with said indicator means.

7. The device of claim 6 wherein said circuit means includes a first and a second resistor means in parallel circuit relation with said rectifier and said indicator means, said first and said second resistor means biasing said silicon controlled rectifier so as to prevent a flow of current therethrough when said sensor means is closed, the biasing potential of said silicon controlled rectifier being increased causing same to conduct said current and activate said indicator means when said sensor means is opened.

* * * * *